United States Patent [19]

Tamura et al.

[11] Patent Number: 5,296,577
[45] Date of Patent: Mar. 22, 1994

[54] PROCESS FOR PRODUCING ACRYLAMIDE POLYMER

[75] Inventors: Hitoshi Tamura; Teruzo Otsuka, both of Noda; Shoichi Kanda; Masaharu Nagahama, both of Yokohama, all of Japan

[73] Assignees: Diafloc Co., Ltd.; Nitto Chemical Industry Co., Ltd., both of Tokyo, Japan

[21] Appl. No.: 528,618

[22] Filed: May 25, 1990

[30] Foreign Application Priority Data

May 30, 1989 [JP] Japan .................................. 1-136850

[51] Int. Cl.$^5$ .................. C08F 20/56; C08F 20/54; C08F 4/04
[52] U.S. Cl. ............................ 526/220; 526/218.1; 526/219; 526/219.2; 526/222; 526/224; 526/225; 526/303.1; 526/307.3; 526/307.6
[58] Field of Search ............... 526/220, 303.1, 224, 526/219

[56] References Cited

U.S. PATENT DOCUMENTS 4,306,048 12/1981 Yoshida et al. .................. 526/193

FOREIGN PATENT DOCUMENTS 276659 7/1974 Japan .

*Primary Examiner*—Joseph L. Schofer
*Assistant Examiner*—Fred Zitomer
*Attorney, Agent, or Firm*—Oblon, Spivak, McClelland, Maier & Neustadt

[57] ABSTRACT

There is disclosed a process for producing an acrylamide polymer which comprises polymerizing acrylamide monomer alone or a monomer mixture composed of 50 mole % or more of acrylamide monomer and a monomer capable of copolymerizing with acrylamide monomer in the presence of an azo series polymerization initiator and 0.1% by weight or more of 2-mercaptobenzothiazole or a salt thereof based on the weight of the monomer in an aqueous medium having a pH of 6 or higher at a temperature range of 5 to 100° C., and then drying the resulting material.

15 Claims, No Drawings

PROCESS FOR PRODUCING ACRYLAMIDE POLYMER

BACKGROUND OF THE INVENTION

This invention relates to a process for producing an acrylamide series polymer having good solubility and high molecular weight.

In recent years, a water-soluble acrylamide series polymer has been used in various fields such as coagulants, petroleum recovering agents, binders for paper formation, paper force-reinforcing agents, etc. in large amounts. Of these uses, coagulants, petroleum recovering agents and binders for paper formation are often required to be high molecular weight and those having an average molecular weight of 10,000,000 are not unusual. As a process for obtaining such a high molecular weight acrylamide series polymer, various proposals have been made but the method in which polymerization is carried out by using a free radical initiator in an aqueous medium is industrially most popular. In this case, a water-containing polymer obtained generally contains several ten % or more of water but the molecular weight or the polymer is too high so that it is a rubber like material of a viscous liquid which does not substantially flow. Accordingly, handling of these materials is difficult as such and transportation is also uneconomical, and thus, they are generally used in the form of dry powder by removing water from the above water-containing polymer by hot-air drying, etc.

However, solubility of the dried polymer obtained by heat drying method in water becomes generally bad as the concentration of the monomer at polymerization, the molecular weight of the polymer and drying temperature are increased. This lowering in solubility can be improved to a certain extent by elongating the time of dissolution at use. However, in extreme cases, particles which merely swell and do not dissolve are present in a large amount even when they are stirred for a long period of time in water. Thus, when it is applied to waste water processing, etc. as a coagulant, it shows low coagulating property. Also, there are problems that, when it is used as a petroleum recovering agent, penetrating property is lowered and when it is used as a viscosity increasing agent for papermaking fish eye is generated on a paper prepared therewith.

On the other hand, as a stabilizing agent for an acrylamide polymer, it has been known that 2-mercaptobenzothiazole is effective as disclosed in Japanese Patent Publication No. 27659/1974 and there is described that the compound is added to the polymer after polymerization has completed. Also, in this publication, while there is a description suggesting to co-present the above stabilizer at polymerization, it is not specifically disclosed. Mercaptanes have been known rather as a molecular weight controller as described in "High Molecule Chemistry, the first volume" (written by P. J. Flory, translated by Oka and Kanamaru, published by Maruzene Co., October 1955), page 137, so that if mercaptanes such as 2-mercaptobenzothiazole, etc. are added during polymerization, it has been considered that the molecular weight is lowered by its chain transfer effect whereby high molecular weight product can hardly be obtained.

Also, in Japanese Patent Publication No.8688/1985, there is described that 2-mercaptobenzoimidazole which has similar structure as that of 2-mercaptobenzothiazole is added during polymerization, but an amount thereof added in Example is 0.05% by weight or less based on the monomer. According to the present inventors investigation, it can be confirmed that when it is added with an amount of 0.5% by weight, polymerization does not start at all.

As described above, a process for producing a dried acrylamide type polymer having a large molecular weight and good solubility in water with efficiency is demanded but a technique which satisfies these conditions has not yet been developed at present.

SUMMARY OF THE INVENTION

An object of the present invention is to provide an industrially available dried acrylamide type polymer having high molecular weight in which solubility of the above acrylamide type polymer is improved markedly.

The process for preparing acrylamide polymer of the present invention comprises polymerizing acrylamide monomer alone or a monomer mixture composed of 50 mole % or more, preferably 70 to 95 mole % of acrylamide monomer and a monomer capable of copolymerizing with acrylamide monomer in the presence of an azo series polymerization initiator and 0.1% by weight or more of 2-mercaptobenzothiazole or a salt thereof based on the weight of the monomer in an aqueous medium having a pH of 6 or higher at a temperature range of 5° to 100° C., and then drying the resulting material.

DESCRIPTION OF THE PREFERRED EMBODIMENTS

In the present invention, a monomer capable of copolymerizing with acrylamide may include methacrylamide, acrylic acid, methacrylic acid, salts and aminoalkyl esters of acrylic acid, and methacrylic acid, quaternary ammonium salts of these aminoalkyl esters, styrene sulfonic acid, acrylamidealkyl sulfonic acid and salts thereof, and further acrylonitrile, styrene, lower alkyl esters of acrylic acid and methacrylic acid can be used simultaneously to the amount which does not impair water-soluble property of the formed polymer.

In the present invention, the amount of 2-mercaptobenzothiazole is 0.1% by weight or more based on the weight of the monomer, but more preferably 0.3 to 2.0% by weight. If the amount of 2-mercaptobenzothiazole is less than 0.1%, improved effect in solubility of the polymer may be sometimes insufficient on the other hand if it exceeds 2.0%, further improvement is not observed and it becomes disadvantageous in economy. 2-Mercaptobenzothiazole can be added in the polymerization system in the form of powder as such, or added after dispersing in water in the form of a slurry or dissolving therein. In each case, it is desired to initiate polymerization after controlling a pH of the system to a predetermined value and completely dissolving 2-mercaptobenzothiazole in the system. A salt of 2-mercaptobenzothiazole may include an alkali metal salt thereof such as Na, K, etc.

The polymerization process of the present invention is an aqueous polymerization method using a usual azo series initiator, and preferably carried out by adding 0.0001 to 0.2% by weight based on the weight of the monomer of an aqueous azo series initiator such as 2,2'-azobis-(2-ami-dinopropane) dihydrochloride, 4,4'-azobis-(4-cyanovaleric acid), 2,2-azobis(N,N'-dimethyleneisobutylamidine) dihydrochloride, etc. to the above monomer aqueous solution mainly comprising acrylamide with an amount of 5 to 70% by weight, preferably 10 to 50% by weight, and polymerizing at 5° to 100° C. In addition to the azo series initiator, a redox series initiator such as peroxide including persulfate, hydrogen peroxide and alkyl peroxide, or a combination of these and a reducing agent such as a tertiary amine, sulfite and ferrous salt may be added simultaneously in order to easily initiate the polymerization at a lower temperature. When the polymerization is carried out by using a reactor in which removal of heat of polymerization is insufficient due to high monomer concentration, it is industrially advantageous to combinedly use the above azo series initiator and the redox initiator since the range of the polymerization temperature can be broadened. A molecular weight of the polymer greatly depends on the kind and concentration of the initiator, polymerization temperature and the concentration of the monomer.

A pH of the polymerization system is one of the important factors constituting the present invention, and the polymerization is carried out at a pH of 6 or higher in the present invention. The function of improving solubility of the polymer possessed by 2-mercaptobenzothiazole is as described above to deactivate radicals which are harmful to the polymerization, but the ability thereof depends on the dissociation state of 2-mercaptobenzothiazole. The pH is preferably 7 or higher.

The polymerization conditions in the present invention have characteristics that the azo series one is used as an initiator, the temperature is set at 5° to 100° C. and the pH is set to 6 or higher. Under these conditions, 2-mercaptobenzothiazole acts suitably and gives the polymer good solubility without having a bad effect on the polymerization reaction. Radicals of the azo series initiator are not deactivated directly by 2-mercaptobenzothiazole as is the redox initiator and do not substantially affect the polymerization reaction. Since the azo series initiator is generally low in activity at a low temperature, it may be possible to combinedly add a small amount of the redox initiator. In the low temperature region, radicals of the redox initiator are less deactivated directly by 2-mercaptobenzothiazole. However, in this case, it is necessary to set the polymerization temperature to 5° C. or higher. If the temperature is less than 5° C., initiation of the polymerization is markedly delayed so that desirable polymer cannot be obtained. To the contrary, if the polymerization temperature is more than 100° C., water present in the polymerization system boils or harmful radicals locally occur with a large amount whereby the solubility of the polymer becomes poor even when 2-mercaptobenzothiazole is present.

In the present invention, it can be considered that 2-mercaptobenzothiazole decreases the amount of insolubles which occur at the polymerization and also effectively decreases the amount of insolubles which occur at the procedure thereafter, particularly at the drying procedure at which the polymer is exposed to a high temperature. Further, the acrylamide polymer may be sometimes used practically by effecting hydrolysis during the polymerization or after the polymerization to change a part of the amide group to the carboxyl group, but 2-mercaptobenzothiazole has also the effect of preventing deterioration cf the polymer during the hydrolysis procedure.

While functional mechanism of 2-mercaptobenzothiazole is unclear, findings obtained by various investigations which had been carried out to accomplish the present invention by the present inventors revealed some interesting observations.

(1) In the course of the polymerization, the polymer has defect structure by a partial dehydrogenation-oxidation whereby a branch or cross-linking structure is formed during the polymerization procedure or a procedure thereafter. And the solubility of the polymer becomes poor. Radicals which cause the dehydrogenation-oxidation are considered to be generated from the redox series initiator, peroxide initiator, or peroxide of a monomer present in the monomer with a minute amount or the polymer, but 2-mercaptobenzothiazole deactivates these harmful radicals.

(2) 2-Mercaptobenzothiazole acts as a moderate chain transfer agent during the polymerization and inhibits formation of a polymer having an abnormally high molecular weight. From this aspect, it contributes to improvement in solubility of the polymer.

(3) During the procedures of hydrolysis and drying, the concentrated polymer is exposed to a high temperature so that harmful radicals are formed from oxygen in air or residual initiator used at the polymerization. Based on this, dehydrogenation-oxidation of the polymer occurs as in the above (1) whereby a branch or cross-linking structure which makes the solubility of the polymer insufficient is formed, but 2-mercaptobenzothiazole deactivates these harmful radicals.

The polymerization in the aqueous solution is explained above, but in the present invention, the polymerization can be carried out in a solvent which hardly dissolves water and a monomer, for example, a form of so-called the reverse phase suspension polymerization in which the polymerization is carried out by dispersing a monomer aqueous solution in an aliphatic hydrocarbon as a fine liquid drop, so long as 0.1% by weight or more of 2-mercaptobenzothiazole based on the monomer can be distributed and maintained in a phase comprising a monomer and water. Also, a known molecular weight controller or an agent necessary for preventing adhesiveness of the water-containing polymer may be added to the polymer system without problems.

For effecting drying of the water-containing polymer thus obtained, the water-containing polymer is optionally shaped to a thin layer state, a fine string state or a granular state depending on the flowability, and then introduced in a dryer to effect drying. The dryer used can be known type heat dryers such as stationary, stirring, continuous, batch, normal pressure, reduced pressure, etc. A relatively low temperature of the drying atmosphere has heretofore been a relatively low temperature of 60° C. or so, but in the present invention, a relatively high temperature of 80° to 110° C. can also be used. However, there is a fear that the polymer may become insoluble when it is maintained at a temperature exceeding 100° C. for a long period of time, so that the drying time is desirably carried out at necessary minimum conditions by making sure of the temperature of the polymer itself and water content thereof.

According to the process of the present invention, a polymer with high molecular weight of 10,000,000 to 15,000,000 or so can be obtained

EXAMPLES

In the following, the present invention is described in more detail by referring to Examples.

Evaluation of the solubility was carried out by dissolving 0.5 g of a resulting dried polymer in 500 cc of water at room temperature for 4 hours under stirring, and then filtering through a wire netting with 80 mesh, washing with water and measuring the weight of an insoluble swelled gel (insolubles) remained on the wire netting, and when the amount of insolubles is 7 grams or less, the solubility was judged to be good.

All "part"s in the Examples represent "parts by weight" and "%" represents "% by weight" unless specifically be mentioned. The molecular weight M was calculated from the formula: $[\eta]=3.73 \times 10^{-4} \times M^{0.66}$.

EXAMPLE 1

In a polymerization vessel with a volume of 3 liters were charged 29 parts of acrylamide monomer, 1.0% of 2-mercaptobenzothiazole sodium salt based on the monomer and 71 parts of water, and after adjusting the pH to 12 by adding sodium carbonate, the air in the vessel was replaced by the nitrogen gas and the vessel was cooled to 10° C. The vessel was placed in the bath equipped with a temperature controller which can follow the elevation of the temperature of inside of the vessel. The temperature of the bath was initially maintained to 10° C. Then, 0.03 part of 2,2'-azobis-(2-amidinopropane) dihydrochloride, 0.003 part of potassium persulfate and 0.003 part of Rongalite C (sodium formaldehyde sulfoxylate) were added to the mixture to initiate the polymerization. After the elevation of inner temperature of the polymerization vessel had stopped, a water-containing polymer gel was taken out. A maximum temperature of the inner temperature was 96° C. After this gel was allowed to stand at 85° C. for 10 hours, the gel was crushed to granules having a diameter of about 3 mm, dried in a hot-air dryer at 80° C. for 15 hours, and then pulverized to a particle size of 1 mm or less by a Wiley type pulverizer. A polymer powder thus obtained has good solubility in water and insolubles were 1 gram or less.

A Brookfield viscosity of a 0.1% solution of this polymer (hereinafter abbreviated to as "0.1% B type viscosity" ) was 710 cp, a molecular weight was 14,000,000 and an anion equivalent by the colloidal titration was 2.3 milliequivalent/gram.

A solubility of the above water-containing polymer gel in which drying was carried out at 90° C. for 10 hours was also good and insolubles were 2 grams.

COMPARATIVE EXAMPLE 1

A water-containing polymer gel was obtained in the same conditions as in Example 1 except for using 2-mercaptobenzothiazole sodium salt. Polymerization behavior (change in polymerization temperature with a lapse of time) was substantially the same as in that of Example 1. This water-containing polymer gel was crushed to granules having a diameter of about 3 mm, dried in a hot-air dryer at 80° C. for 10 hours, and then pulverized to a particle size of 1 mm or less by a Wiley type pulverizer. Solubility to water of the resulting polymer was bad and insolubles were 20 grams. The water-containing polymer gel was dried at 90° C. for 10 hours instead of 80° C. for 10 hours. Polymers thus obtained had a large amount of insolubles so that we could not evaluate the solubility of the polymer.

EXAMPLES 2 to 5

In a polymerization vessel with a volume of 3 liters were charged 20 parts of acrylamide monomer 5 parts of acrylic acid, each 0.1, 0.5, 1.0 and 2.0% of 2-mercaptobenzothiazole sodium salt based on the monomer and 75 parts of water, and after adjusting the pH to 8, the air in the vessel was replaced by the nitrogen gas and the vessel was cooled to 9° C. The vessel was placed in the bath equipped with a temperature controller which can follow the elevation of the temperature of inside of the vessel. The temperature of the bath was initially maintained to 9° C., and the above polymerization vessel was placed in the bath. Then, 0.04 part of 2,2'-azobis-(2-amidinopropane) dihydrochloride, 0.004 part of potassium persulfate and 0.012 of Rongalite C (sodium formaldehyde sulfoxylate) were added to the mixture, and after the elevation of inner temperature of the polymerization vessel had stopped, a water-containing polymer gel was taken out. Temperature change with a lapse of time during the polymerization was substantially the same in each case, and a maximum temperature was 76° to 78° C. After these gels were dried in a hot-air dryer at 80° C. for 15 hours, they were pulverized to a particle size of 1 mm or less by a Wiley type pulverizer and the same evaluation as in Example 1 was carried out. The results are shown in Table 1.

COMPARATIVE EXAMPLES 2 and 3

In the same manner as in Examples 2 to 5 except for replacing the amount of 2-mercaptobenzothiazole sodium salt to 0 and 0.05% based on the monomer, water-containing polymer gels were prepared, respectively. After these gels were dried in a hot-air dryer at 80° C. for 5 hours, they were pulverized to a particle size of 1 mm or less by a Wiley type pulverizer and the same evaluation as in Example 1 was carried out. The results are shown in Table 1.

EXAMPLE 6

In a polymerization vessel with a volume of 3 liters were charged 20 parts of acrylamide monomer 5 parts of acrylic acid, 1.0% of 2-mercaptobenzothiazole sodium salt based on the monomer and 75 parts of water, and the mixture was stirred but 2-mercaptobenzothiazole did not dissolve and was in a dispersed state. To the mixture was added sodium hydroxide to adjust pH to 9, and after confirming dissolution of 2-mercaptobenzothiazole completely, the air in the vessel was replaced by nitrogen gas and the vessel was cooled to 9° C. To the mixture was added 0.04 part of 2,2'-azobis-(2-amidinopropane) dihydrochloride and the same procedures as in Example 2 were carried out to obtain dried polymer.

COMPARATIVE EXAMPLE 4

Polymerization was carried out under the same conditions as in Example 6 except for replacing 2-mercaptobenzothiazole with 2-mercaptobenzoimidazole, but an objective polymer could not be obtained finally since the polymerization reaction became too slow.

EXAMPLES 7 to 9

In a polymerization vessel with a volume of 3 liters were charged 29 parts of acrylamide monomer, 0.7% of 2-mercaptobenzothiazole sodium salt based on the monomer and 71 parts of water, and the pH was adjusted to 11, 12 and 13, respectively, by using boric acid and sodium hydroxide. Subsequently, in the same manner as in Example 1, polymers were obtained. Drying of the polymers were carried out at 80° C. and polymers shown in Table 1 can be obtained.

EXAMPLES 10 to 13

In a polymerization vessel with a volume of 3 liters were charged 20 parts of acrylamide monomer, 5 parts of acrylic acid, 0.5% of 2-mercaptobenzothiazole sodium salt based on the monomer, 0.06 part of 2,2'-azobis(N,N'-dimethylene-isobutylamidine) dihydrochloride and 75 parts of water, and after the mixture was adjusted to pH to 6, 7, 8 and 9, respectively, by using sodium hydroxide, the system was replaced with nitrogen. Subsequently, in the same manner as in Example 2, polymers were obtained. Provided that the temperature at initiating the polymerization was set to 12° C. Qualities of the polymers are as shown in Table 1.

COMPARATIVE EXAMPLE 5

Polymerization was carried out under the same conditions as in Examples 10 to 13 except for adjusting the pH to 5. Quality of the resulting polymer is as shown in Table 1.

EXAMPLE 14

The water-containing polymer gel obtained in Example 1 was dried at 60° C. for 18 hours in a hot-air dryer, and in the same manner as in Example 1, powder state polymer was obtained. When insolubles thereof were measured and was 1 gram or less. This polymer was dissolved in a 2% saline solution with an amount of 0.04%, and an amount of 160 ml of the solution was filtered through a filter of 5 micron (12.5 cm$^2$) under pressure without causing pressure elevation.

COMPARATIVE EXAMPLE 6

From the water-containing polymer gel obtained in Comparative example 1, a powder polymer was obtained in the same manner as in Example 14 and when insolubles thereof were measured and were 1 gram or less. However, when this polymer was subjected to pressure filtration test mentioned in Example 14, pressure was remarkably increased when 15 ml of the solution was filtered and the filtration could not be continued any more.

COMPARATIVE EXAMPLE 7

In order to try to obtain a polymer having 0.1% B type viscosity of 600 cp and a molecular weight of 13,000,000, an anion equivalent value of 2.3 milliequivalent/gram and insolubles of 5 grams or less, the same polymerization was carried out as in Example 2 except that a combination of potassium persulfate and sodium hydrogen sulfite was used as initiators, and during polymerization, 0.5% of 2-mercaptobenzothiazole sodium salt based on the monomer was added. In order to control the molecular weight (0.1% B type viscosity) of the polymer, polymerizations were carried out by changing an amount of the initiator, but in each of the cases, the polymerization reaction was remarkably delayed during the course of the polymerization and the molecular weight of the resulting polymer was low whereby the objective polymer could not be obtained.

TABLE 1

| | 2-Mercaptobenzothiazole sodium salt added amount (% based on monomer) | pH at polymerization | Characteristics of dried polymer | | |
|---|---|---|---|---|---|
| | | | 0.1% B type viscosity (cp) | Anion equivalent value (meq/g) | Insolubles (g) |
| Example 1 | 1.0 | 12 | 710 | 2.3 | less than 1 |
| Comparative example 1 | 0 | 12 | 730 | 2.2 | 20 |
| Example 2 | 0.1 | 8 | 610 | 2.1 | 5 |
| Example 3 | 0.5 | 8 | 620 | 2.2 | 1 |
| Example 4 | 1.0 | 8 | 600 | 2.2 | less than 1 |
| Example 5 | 2.0 | 8 | 595 | 2.1 | less than 1 |
| Comparative example 2 | 0 | 8 | 610 | 2.2 | 13 |
| Comparative example 3 | 0.05 | 8 | 595 | 2.2 | 10 |
| Example 6 | 1.0 | 9 | 610 | 2.1 | less than 1 |
| Example 7 | 0.7 | 11 | 800 | 1.5 | 3 |
| Example 8 | 0.7 | 12 | 730 | 2.1 | less than 1 |
| Example 9 | 0.7 | 13 | 680 | 2.7 | less than 1 |
| Example 10 | 0.5 | 6 | 630 | 2.1 | 7 |
| Example 11 | 0.5 | 7 | 620 | 2.2 | 3 |
| Example 12 | 0.5 | 8 | 595 | 2.2 | 2 |
| Example 13 | 0.5 | 9 | 580 | 2.4 | 2 |
| Comparative example 5 | 0.5 | 5 | 630 | 2.2 | 30 |

According to the process of the present invention, drying of the water-containing polymer gel can be carried out at a relatively high temperature, and a dried acrylamide series polymer having good solubility to water and having high molecular weight can be produced industrially. This polymer is available as a coagulant and a chemical for recovering petroleum, etc.

We claim:

1. A process for producing an acrylamide polymer which comprises polymerizing acrylamide monomer alone or a monomer mixture composed of 50 mole % or more of acrylamide monomer and a monomer capable of copolymerizing with acrylamide monomer in the presence of an azo series polymerization initiator and 0.1 % by weight or more of 2-mercaptobenzothiazole or a salt thereof based on the weight of the monomer in a aqueous medium having a pH of 6 or higher at a temperature range of 5° to 100° C, and then drying the resulting material.

2. The process of producing an acrylamide polymer according to claim 1, wherein said monomer capable of copolymerizing with acrylamide monomer is selected from the group consisting of methacrylamide, acrylic acid, methacrylic acid, salts and aminoalkyl esters of acrylic acid and methacrylic acid, quaternary ammonium salts of these aminoalkyl esters, styrene sulfonic acid and acrylamidealkyl sulfonic acids and salts thereof.

3. The process for producing an acrylamide polymer according to claim 1, wherein an amount of said 2-mercaptobenzothiazole or a salt thereof is 0.3 to 2.0% by weight based on the total amount of the monomer.

4. The process for producing an acrylamide polymer according to claim 1, wherein said monomer is contained in said aqueous medium in an amount of 5 to 70% by weight.

5. The process for producing an acrylamide polymer according to claim 4, wherein said monomer is contained in said aqueous medium in an amount of 10 to 50% by weight.

6. The process for producing an acrylamide polymer according to claim 1, wherein said azo series polymerization initiator is a water-soluble azo initiator.

7. The process for producing an acrylamide polymer according to claim 6, wherein said water-soluble azo initiator is selected from 2,2'-azobis-(2-amidinopropane) dihydrochloride, 4,4'-azobis-(4-cyanovaleric acid) and 2,2-azobis-(N,N'-dimethyleneisobutylamidine) dihydorchloride.

8. The process for producing an acrylamide polymer according to claim 7, wherein an amount of said water-soluble azo initiator is 0.0001 to 0.2% by weight based on the total amount of the monomer.

9. The process for producing an acrylamide polymer according to claim 1, wherein a redox initiator is further added in an aqueous medium.

10. The process for producing an acrylamide polymer according to claim 9, wherein said redox initiator is a peroxide selected from persulfate, hydrogen peroxide and alkyl peroxide, and a combination of these and a reducing agent selected form a tertiary amine, sulfite and ferrous salt.

11. The process for producing an acrylamide polymer according to claim 9, wherein a reducing agent is further added in a aqueous medium.

12. The process for producing an acrylamide polymer according to claim 11, wherein said reducing agent is a tertiary amine, a sulfite or a ferrous salt.

13. The process for producing an acrylamide polymer according to claim 1, wherein said drying is carried out at 60° to 110° C.

14. The process of claim 1, wherein said 2-mercaptobenzothiazole is present in an amount from 0.1% to 2.0% by weight of the monomer.

15. The process of claim 1, wherein said pH is from 6 to 13.

* * * * *